United States Patent
Lan et al.

(10) Patent No.: US 6,921,870 B2
(45) Date of Patent: Jul. 26, 2005

(54) SHIFTING MECHANISM FOR ELECTRIC VEHICLES

(75) Inventors: Yih-Yuan Lan, Chia-I Hsien (TW);
Ming-Chia Wu, Chia-I Hsien (TW)

(73) Assignee: Link Treasure Limited, Chia-I Hsien (TW)

(*) Notice: Subject to any disclaimer, the term of this patent is extended or adjusted under 35 U.S.C. 154(b) by 0 days.

(21) Appl. No.: 10/673,387

(22) Filed: Sep. 30, 2003

(65) Prior Publication Data

US 2004/0069557 A1 Apr. 15, 2004

(30) Foreign Application Priority Data

Oct. 9, 2002 (TW) ..................................... 91216134 U

(51) Int. Cl.[7] .............................................. H01H 3/00
(52) U.S. Cl. .......................... 200/6 R; 200/6 B; 200/18
(58) Field of Search ................................. 200/6 R, 6 B, 200/17 R, 18, 61.85, 88, 1 R, 5 B

(56) References Cited

U.S. PATENT DOCUMENTS

| | | | | |
|---|---|---|---|---|
| 3,639,705 A | * | 2/1972 | Rayner | ........................ 200/6 A |
| 4,401,866 A | * | 8/1983 | Kaminski et al. | ......... 200/61.88 |
| 4,531,027 A | * | 7/1985 | Vogt et al. | .................... 200/6 A |
| 5,173,591 A | * | 12/1992 | Perego | ...................... 200/61.88 |
| 5,197,344 A | * | 3/1993 | Maier et al. | .............. 200/61.88 |
| 5,644,114 A | | 7/1997 | Neaves | |
| 5,742,014 A | * | 4/1998 | Schwartz et al. | ......... 200/61.27 |

* cited by examiner

*Primary Examiner*—Lincoln Donovan
*Assistant Examiner*—M. Fishman
(74) *Attorney, Agent, or Firm*—Rabin & Berdo, P.C.

(57) ABSTRACT

A shifting mechanism for electric vehicles includes an operation bar coupled with a universal joint mounting on an electric vehicle body. The operation bar may be turned and swiveled in multiple directions and has a free end movable according to preset paths of a guiding means. The operation bar may be swiveled in different directions or through the guiding means to switch circuits that control motor positive rotation and reverse rotation at high speed or low speed. Thereby a definite direction is provided to switch the direction and speed. The switches are located on different positions and arranged in low—high speed and forward (positive rotation)—backward (reverse rotation) fashion so that the backward movement can only be exercised at the low speed to avoid the risk of backward high speed condition to secure safety for children's ride-on electric vehicles.

20 Claims, 12 Drawing Sheets

US 6,921,870 B2

SHIFTING MECHANISM FOR ELECTRIC VEHICLES

FIELD OF THE INVENTION

The present invention relates to a shifting mechanism for electric vehicles that includes an operation bar, pivotally located in a guiding means. It swivels or moves in parallel with a straight line along preset paths, to control shifting of motor rotation in positive or reverse direction at high speed or low speed.

BACKGROUND OF THE INVENTION

There are many types of electric vehicles for children on the market. Some are designed for remote control use, and some are ride-on models for seating the human body. The invention targets the ride-on electric vehicles for children. They usually imitate the real vehicles and may include jeeps, beach vehicles, automobiles, motorcycles, race-cars, golf cars, and the like. The vehicle types and models are abundant to suit all kinds of tastes and preferences of children. Besides varying styles and models, as the ride-on electric vehicles are designed for seating children, safety is the most important design and production consideration.

As previously mentioned, the ride-on electric vehicles for children usually imitate the structure of the real vehicles. They also have a shifting mechanism. The general ride-on electric vehicles for children generally have speed shifting and forward and backward shifting functions. A shift bar is usually provided to achieve the shifting function. The conventional electric vehicles generally have separated shift bars to control speed and positive and reverse rotation. Such a design could easily shift to a high speed and reverse condition, and become very risky. Another example is U.S. Pat. No. 5,644,114. It has an actuator to control shifting of speed and motor rotation direction. The actuator is pivotally installed and may be rocked to trigger switches that are in parallel with the actuator to accomplish the shifting effects. As the actuator is rocked about a pivotal point to perform shifting directly, children often cannot precisely shift to the desired speed or direction. As a result, control is difficult and risky conditions frequently occur.

SUMMARY OF THE INVENTION

In view of the aforesaid disadvantages, the primary object of the invention is to provide a shifting mechanism that has an operation bar coupling with a universal joint installed on a vehicle body that equips with a guiding means. The operation bar may be rocked and swiveled in multiple directions. It also has a free end. Following the paths on the guiding means, the operation bar may be rocked and moved in different directions to switch circuits that control motor rotation in the positive or reverse direction at high speed or low speed. Thereby, a definite direction is provided for shifting turning direction and speed. Meanwhile, the shifting mechanism provides an arrangement of low speed—high speed and forward (positive rotation)—backward (reverse rotation) so that the vehicle can only move backward at low speed, to avoid the risk of high speed reverse and secure safety for the children in use.

Another object of the invention is to have the operation bar pivotally coupled with the guiding means and make the operation bar move according to the paths set in the guiding means so that shifting of speed and direction can be controlled through different directions and positions.

The foregoing, as well as additional objects, features and advantages of the invention will be more readily apparent from the following detailed description, which proceeds with reference to the accompanying drawings. The drawings are only to serve for reference and illustrative purposes, and are not intended to limit the scope of the invention.

BRIEF DESCRIPTION OF THE DRAWINGS

FIG. 8-1 is a schematic diagram of the shifting sequence of the operation bar.

FIG. 10-1 is a schematic diagram of the shifting sequence of the operation bar according to the third embodiment of the invention.

DESCRIPTION OF THE PREFERRED EMBODIMENTS

Figure 1:
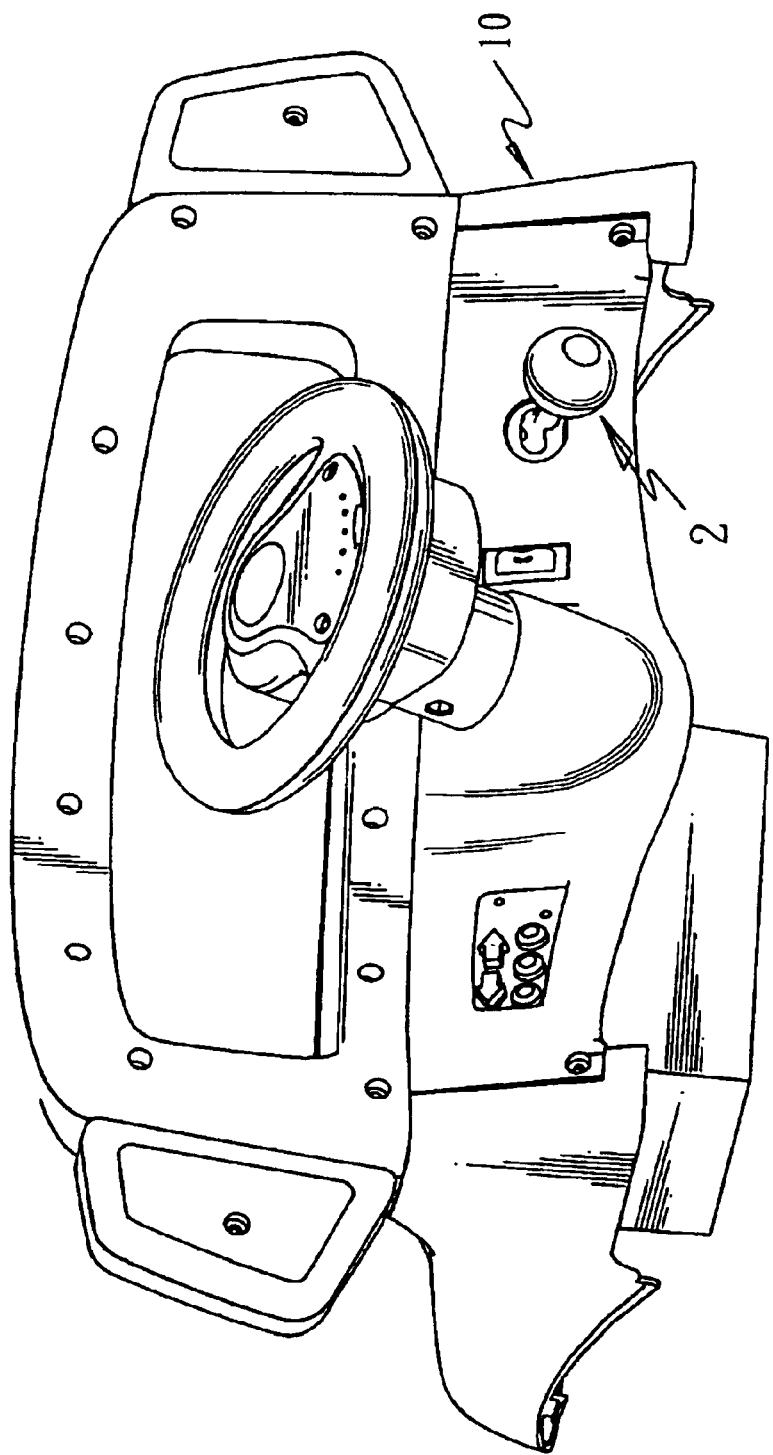
FIG. 1 is a schematic view of the invention.
Figure 2:
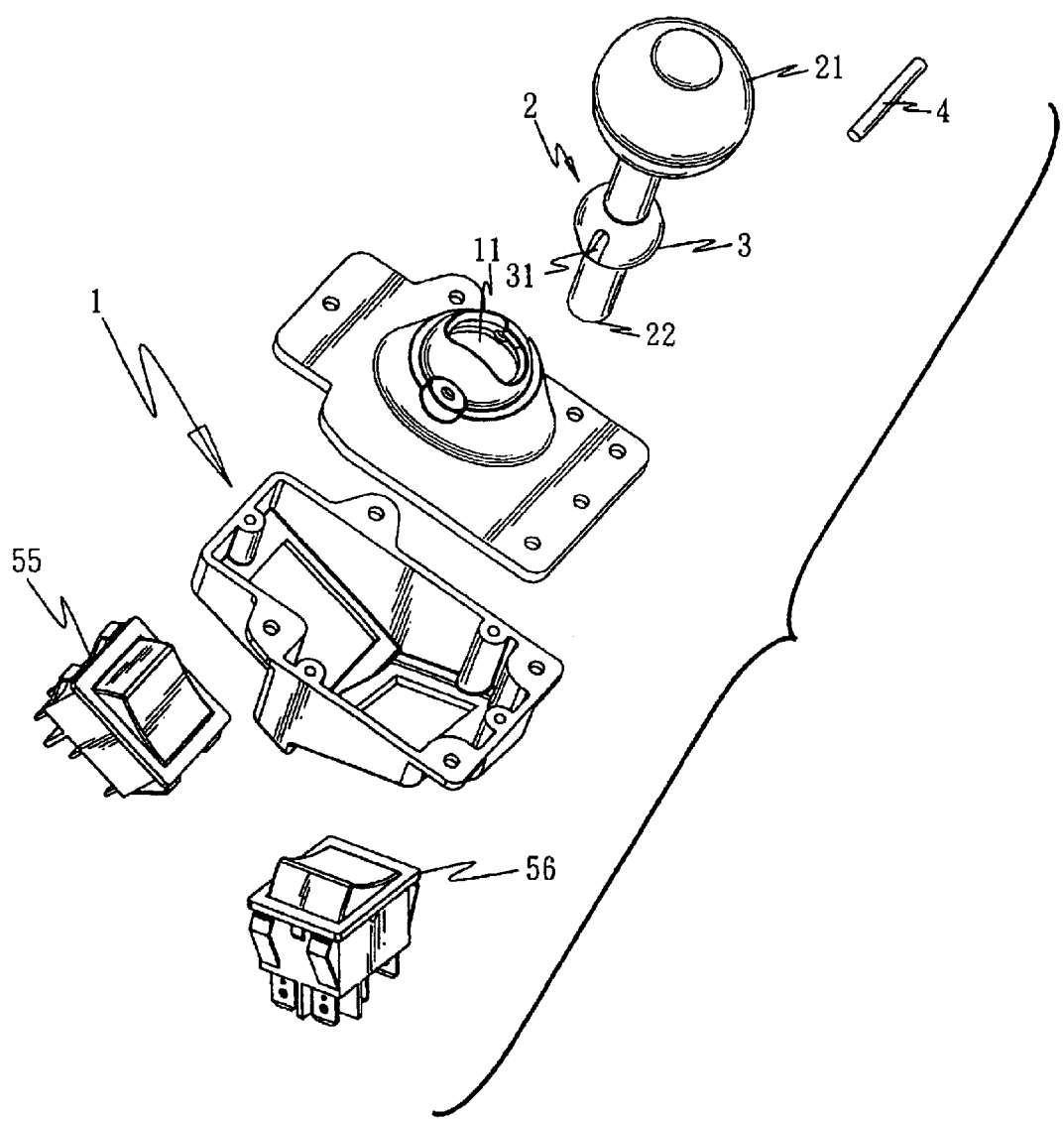
FIG. 2 is an exploded view of the invention.

Embodiment 1:

Referring to FIGS. 1, 2, 4 and 5, the shifting mechanism of the invention is installed on a desired location of an electric vehicle body. It includes housing 1, fixedly mounted on the vehicle body 10 and a guiding means, which, according to one embodiment of the invention, is a guiding slot 11. The guiding slot 11 is formed in an L-shape and includes at least a first moving path 12 and a second moving path 13 formed in a different angle or location from the first moving path. The guiding slot 11 may also be formed in other character shapes depending on design requirements, such as an N, Z, H or U shape that has continuous strokes (shown in FIGS. 11–17).

An operation bar 2 is provided, which has a hand grip section 21 and a free end 22. Users may move the operation bar 2 to make the free end 22 generate rocking and swivel movements. The operation bar 2 further is coupled with a universal joint 3 and is installed in the guiding slot 11 through a pivot axle 4. In the embodiment the universal joint 3 includes two fan-shaped pivot slots 31 on two sides to allow the pivot axle 4 to pass through to pivotally couple on the vehicle body 10, so that the operation bar 2 may have at least two different turning directions through the universal joint 3.

Figure 3:
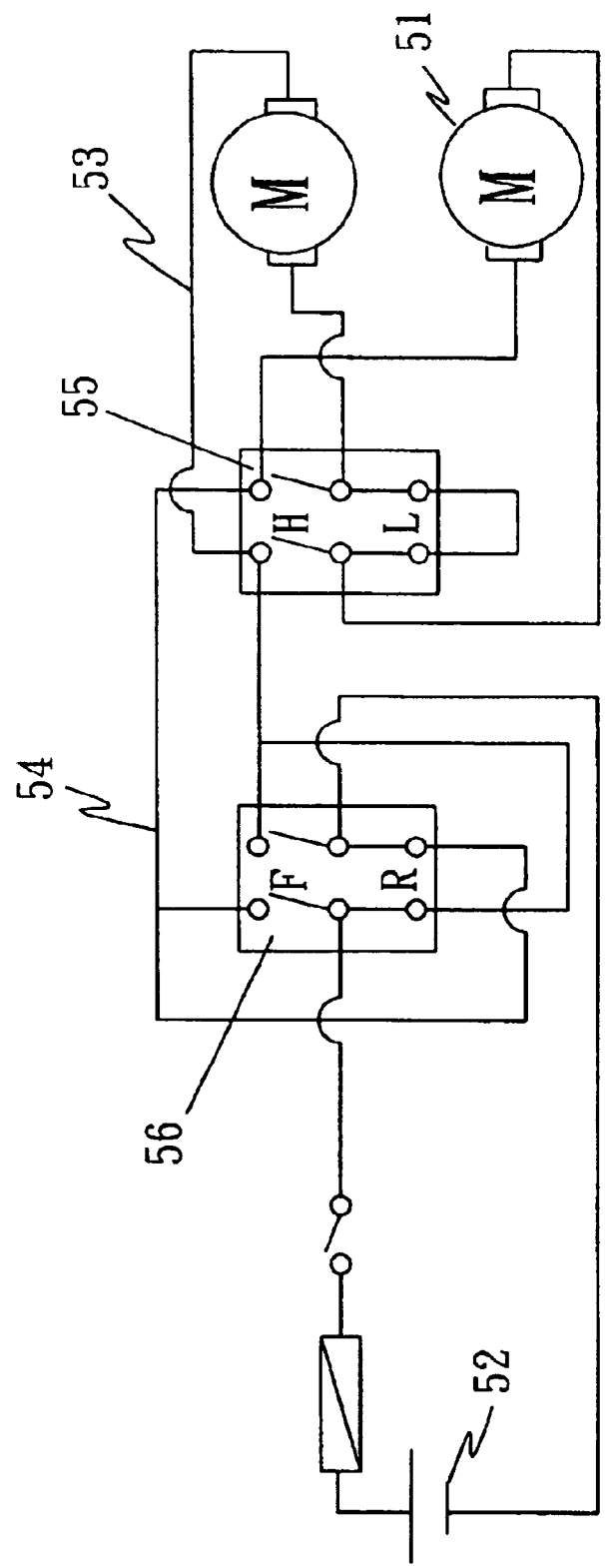
FIG. 3 is a circuit diagram of the invention.
Figure 4:
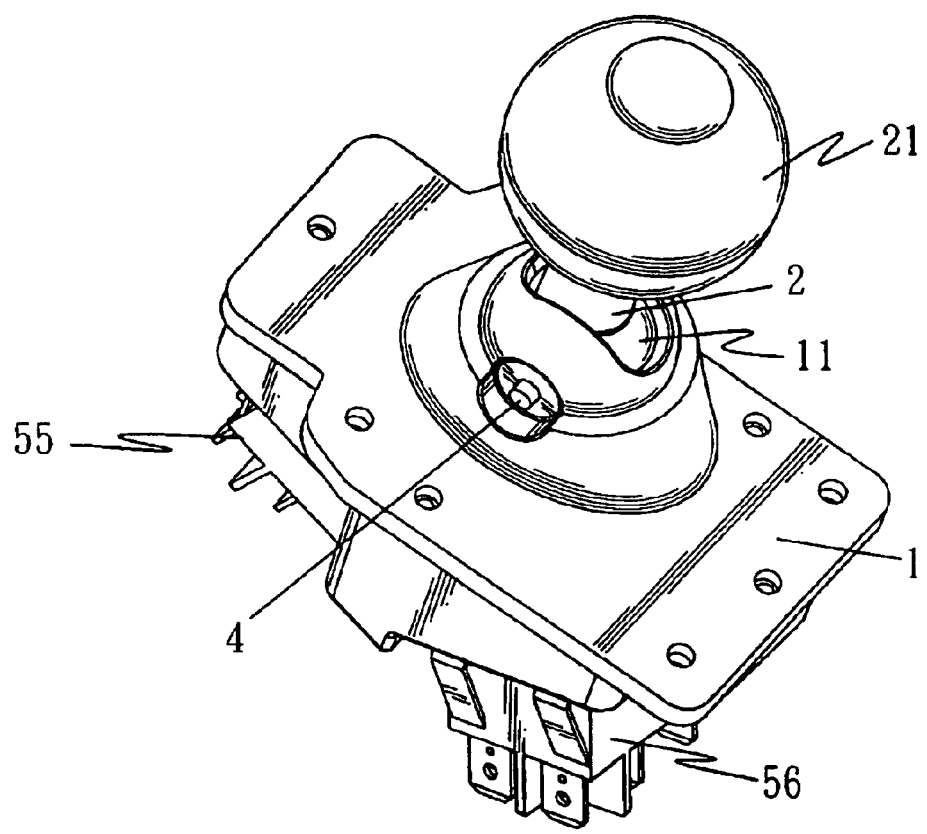
FIG. 4 is a fragmentary perspective view of the invention.
Figure 5:
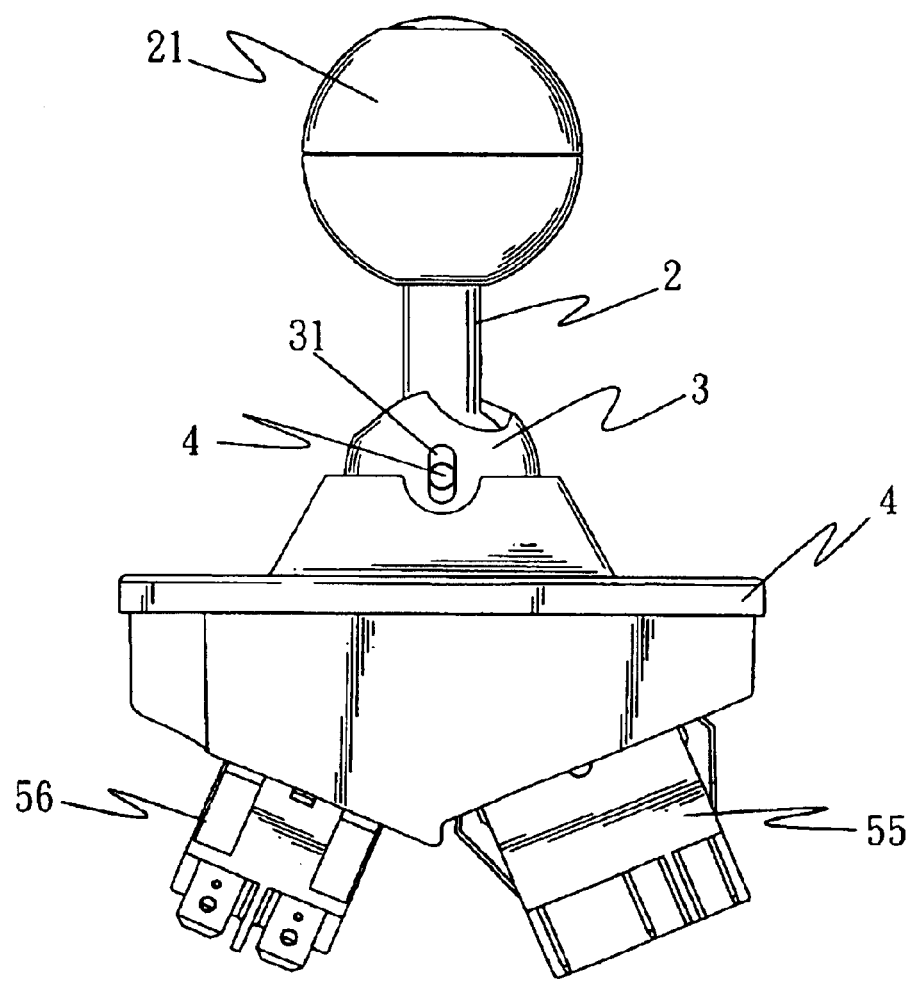
FIG. 5 is a fragmentary side view of the invention.

Refer to FIG. 3 for a circuit device 5 of the invention. It includes a transmission motor 51, battery 52, first circuit 53, second circuit 54, first switch 55 and second switch 56. The first switch 55 and the second switch 56 connect respectively to the transmission motor 51 and battery 52 through the first circuit 53 and the second circuit 54, to control high and low speed and positive and reverse rotation of the transmission motor 51. In addition, the first and second switches 55 and 56 are mounted onto the vehicle body 10 at locations touchable by the free end 22 of the operation bar 2.

Figure 6:
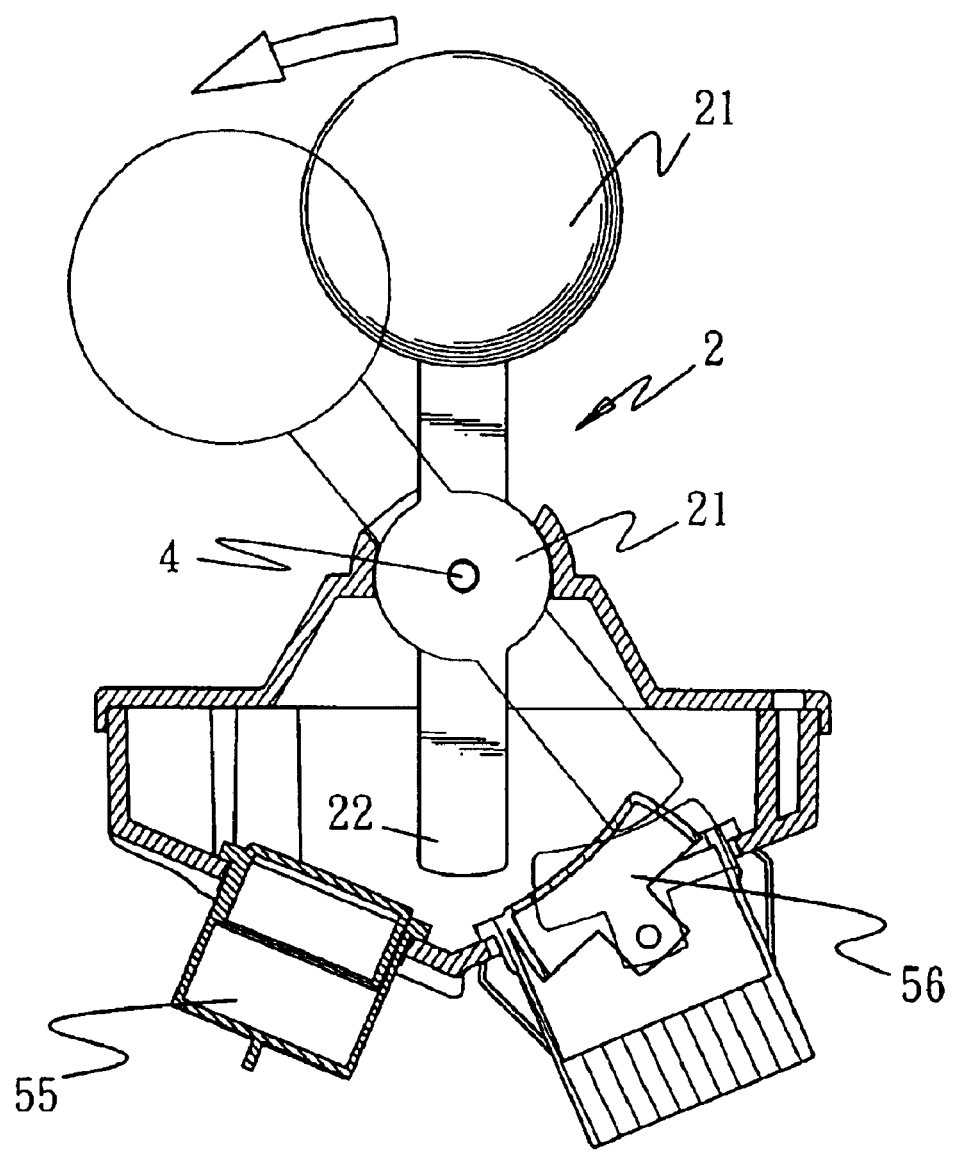
FIG. 6 is a sectional view of the invention.
Figure 7:
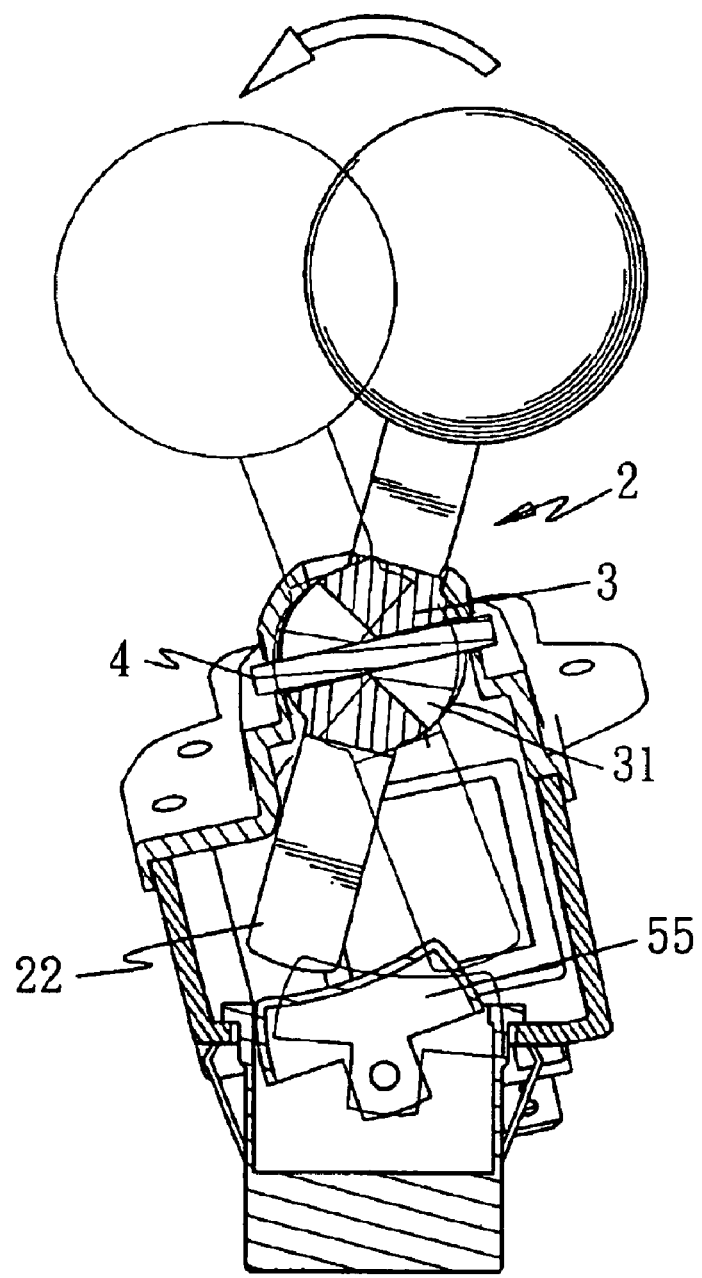
FIG. 7 is another sectional view of the invention.

Referring to FIGS. 6 and 7, the first and second switches 55 and 56 are located below the operation bar 2 at different positions. The first switch 55 controls a high speed circuit H and a low speed circuit L. The second switch 56 controls a motor positive rotation (forward) circuit F and a reverse rotation (backward) circuit R. Hence, when the operation bar 2 is swiveled in the direction of the first moving path 12, the free end 22 can shift the first switch 55 in the sequence of the low speed circuit L and the high speed circuit H. Swiveling in the second moving path 13 can switch in the sequence of a positive rotation (forward) circuit F and the reverse rotation (backward) circuit R for the motor 51.

Figures 1, 8:
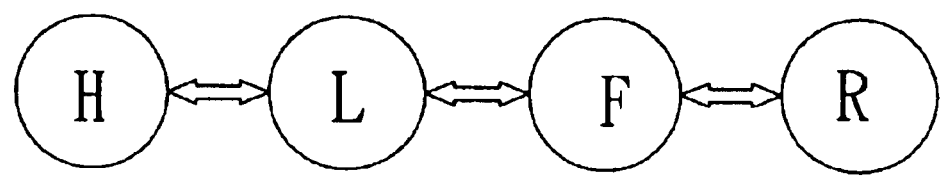
FIG. 8 is a schematic view of the moving path of the operation bar.
Figure 8:
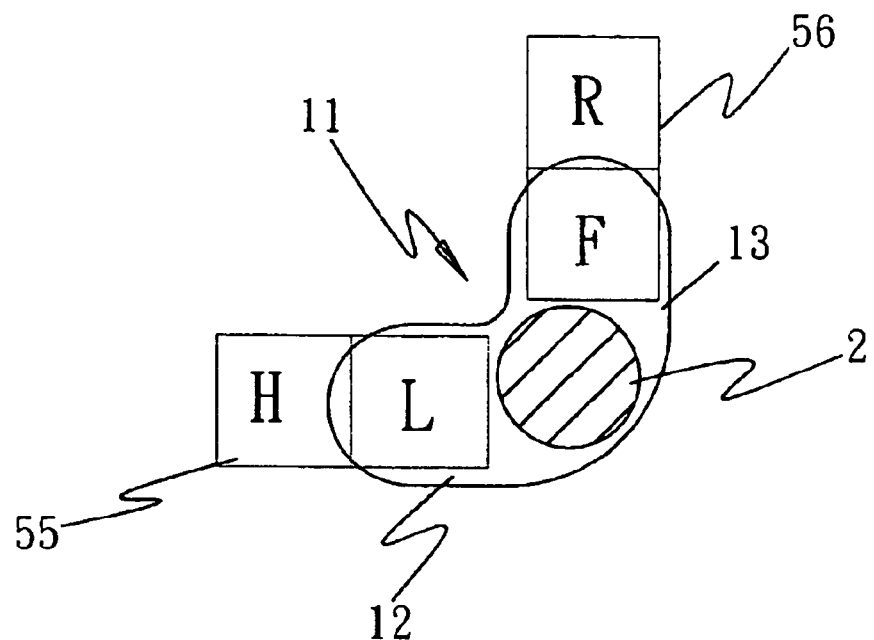

Referring to FIG. 8, when the operator chooses the forward shift gear (positive rotation) circuit F on the second moving path 13 through the operation bar 2, he/she can select the high speed circuit H or the low speed circuit L through the first moving path 12 of different direction to control the first switch 55. When the ride-on electric vehicle is in the condition of high speed circuit H, and the operator selects backward (reverse rotation) circuit R, the free end 22 of the operation bar 2 has to be shifted from the first moving path 12 to the second moving path 13, and the free end 22 must first go through the low speed circuit L of the first switch 22 before entering the second moving path 13. By the same token, when the free end 22 of the operation bar 2 is in the condition of backward (reverse rotation) circuit R and low speed circuit L, and returning to the first moving path 12 is desired, the free end 22 of the operation bar 2 has to pass the forward (positive rotation) circuit F before entering the first moving path 12 to switch to the high speed circuit H or low speed circuit L. Therefore, the backward (reverse rotation) circuit R is always at the low speed circuit L.

Based on previous description, it can be seen that when the invention is in use, the operation sequence is such, that when the operator wants to enter the condition of backward (reverse rotation) circuit R, the free end 22 of the operation bar 2 has to be first shifted to the first switch 55, to reach the state of low speed circuit L, thus the risky condition of moving backward at high speed can be avoided.

Figure 9:
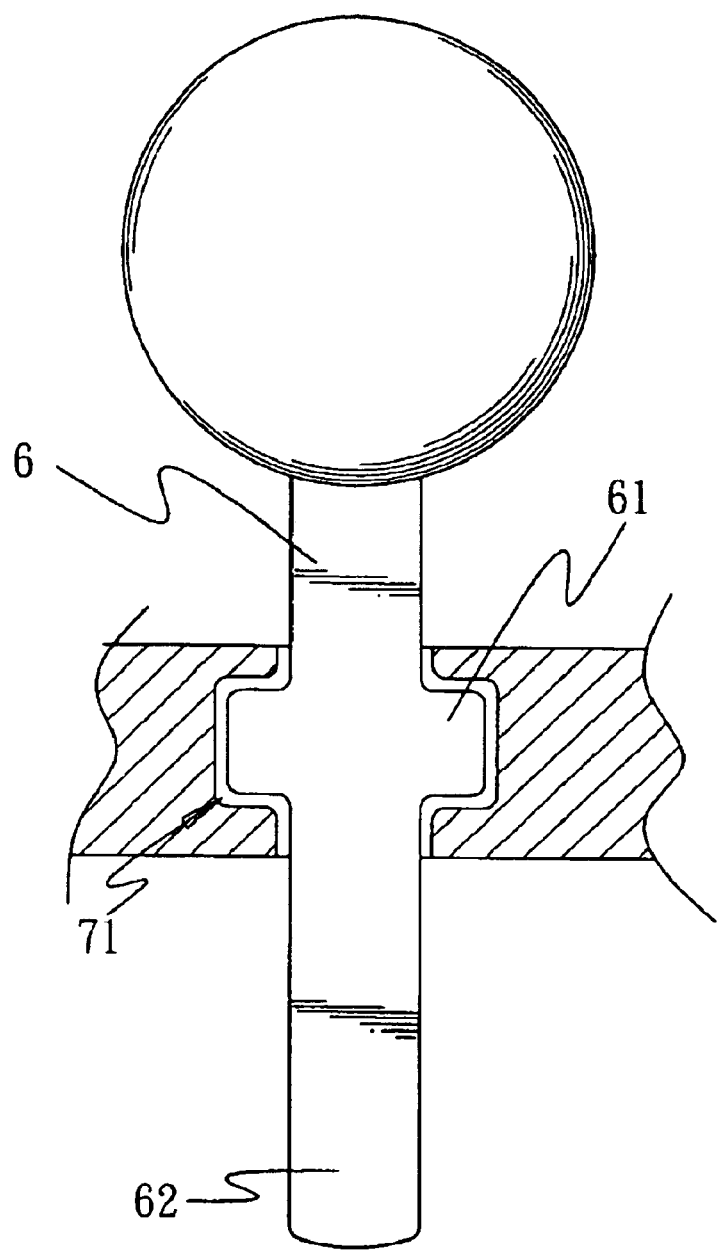
FIG. 9 is a fragmentary schematic view of a second embodiment of the invention.

Embodiment 2:

Referring to FIG. 9, in embodiment 1, the operation bar 2 is pivotally mounted on the vehicle body 10 through the universal joint 3 and the pivot axle 4. By swiveling the hand grip section 21, the free end 22 of the operation bar 2 my be moved to match the moving paths provided by guiding means to shift to the first switch 55 and second switch 56.

In this embodiment, the operation bar 6 has a boss 61, and the guiding slot 7 of the guiding means is formed in an N, Z, H or U shape that has continuous strokes. The guiding means, further, has a housing trough 71 in the cross section, corresponding to the boss 61 so that the operation bar 6 may be movably housed in the housing trough 71. Thereby, the operation bar 6 may be moved along a straight line in parallel with the paths of the housing trough 71 to shift the free end 62 of the operation bar 6 to the first and second switch 55 and 56, so that shifting between high and low speed, and forward and backward can be accomplished.

Figures 1, 10:
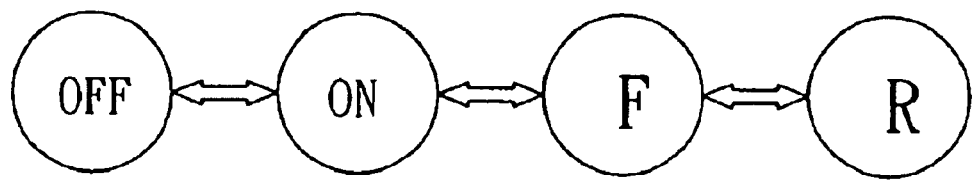
FIG. 10 is a schematic view of the moving path of the operation bar according to the third embodiment of the invention.
Figure 10:
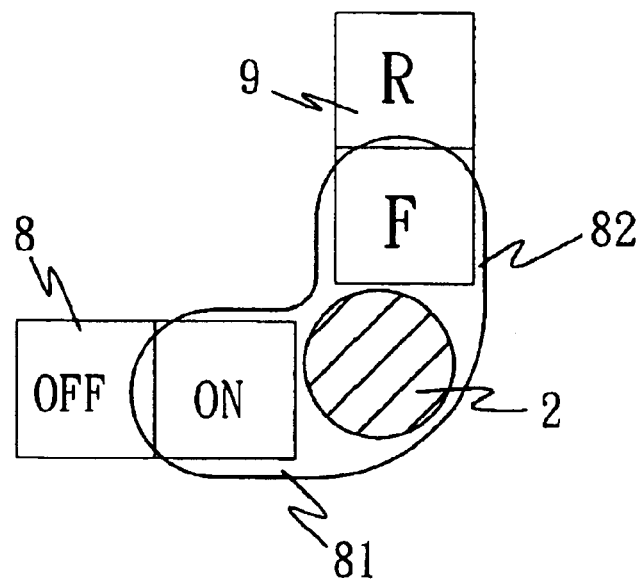
Figure 11:
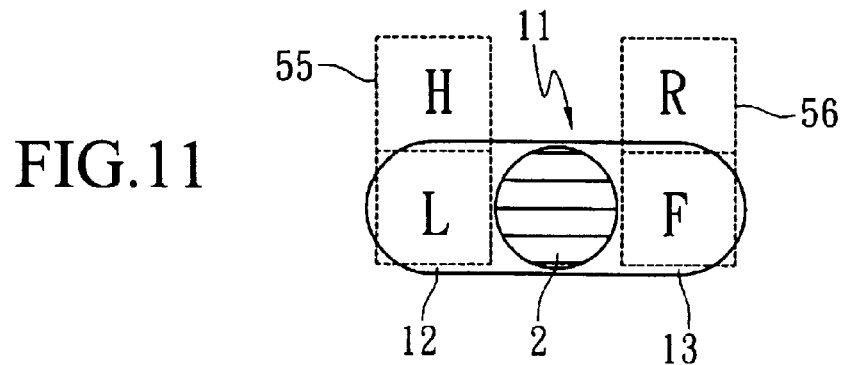
FIGS. 11–17 show various alternative shifting sequences according to other aspects of the invention.
Figure 12:
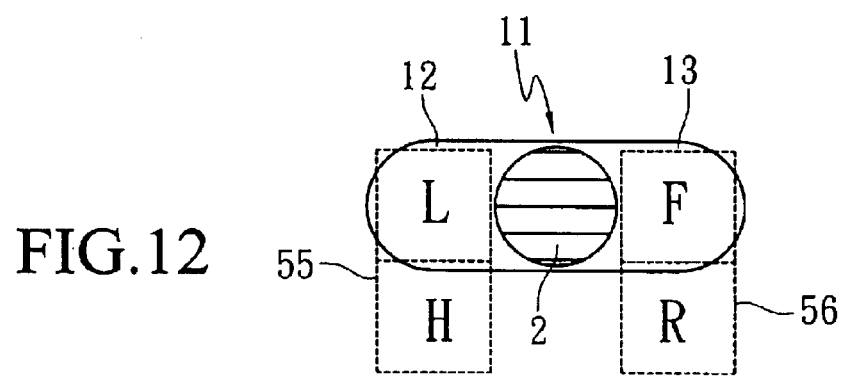
Figure 13:
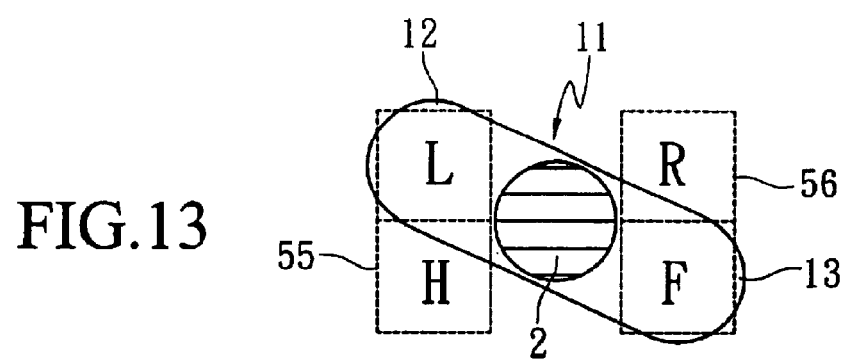
Figure 14:
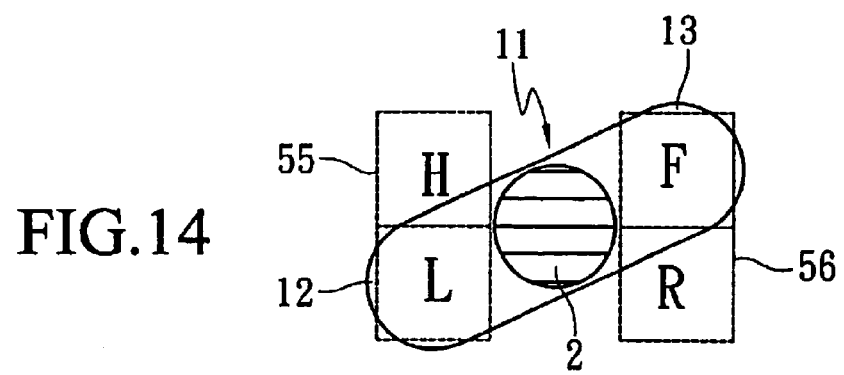
Figure 15:
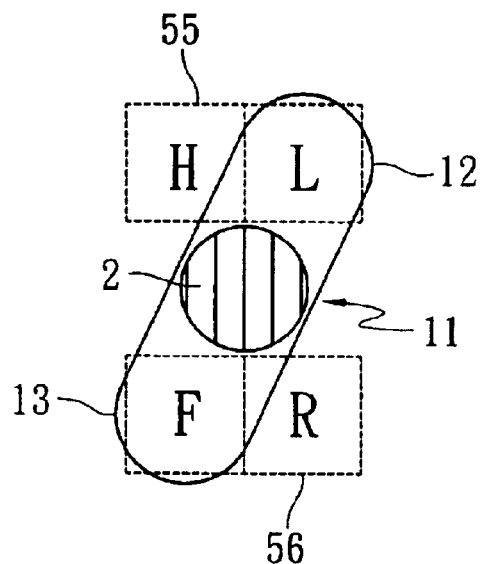
Figure 16:
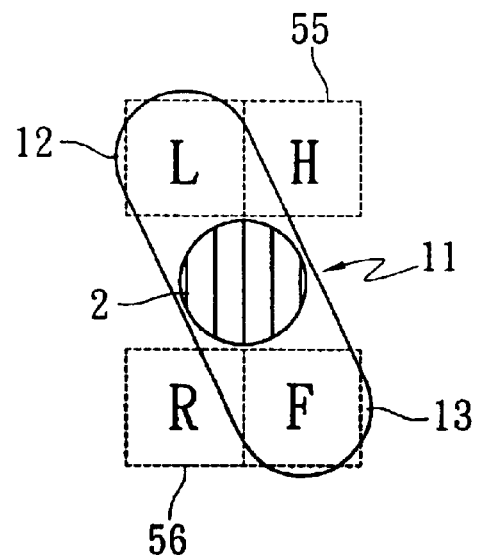
Figure 17:
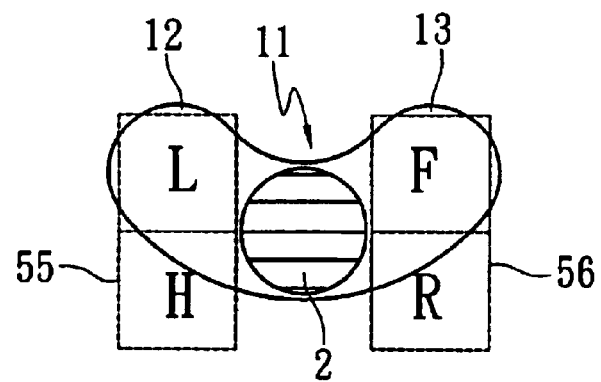

Embodiment 3:

Referring to FIG. 10, the invention may also be adapted on a single rotation speed mechanism. The first switch 8 is connected to a power supply circuit. The operation bar 2 mainly controls an ON circuit and an OFF circuit. The shifting sequence is: the first moving path 81 controls power OFF and ON; the second moving path 82 shifts to the second switch 9; the operation sequence is forward (positive rotation) circuit F—backward (reverse rotation) circuit R.

By means of the constructions set forth above, it is clear that the invention provides an operation bar that can be moved in preset paths of directions to allow users to select and shift to high speed, low speed, forward and backward. Through different arrangements of the switches, moving backward at high speed can be avoided to prevent risky conditions from occurring to the children's ride-on electric vehicles.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A shifting mechanism mounted on an electric vehicle to couple with a first switch to control the first switch to selectively effect a forward rotation, and a reverse rotation of a vehicle motor of the electric vehicle, and to couple with a second switch to switch the second switch between a high rotation speed position and a low rotation speed position, to respectively effect a high rotation speed and a low rotation speed of the vehicle motor, comprising:

a universal joint fixedly mounted on the electric vehicle;

an operation bar located on the universal joint, and having a hand grip section on an upper end for users to move the operation bar, and a free lower end movable to actuate a select one of the first and second switches; and a guiding means fixedly mounted on the electric vehicle for restricting the free end of the operation bar to move reciprocally in a first moving path and a second moving path, the first moving path and the second moving path extending in different directions, the free end being allowed to move in the first moving path to actuate the first switch, and in the second moving path to actuate the second switch;

wherein when the free end of the operation bar is moved from the second moving path to the first moving path, the second switch is automatically and always first switched to the low rotation speed position; and wherein since the first moving path and the second moving path extends in different directions, a user is prevented from accidentally moving the operation bar from the first moving path to the second moving path, and from accidentally moving the operation bar from the second moving path to the first moving path, thereby ensuring the first and second switches are not inadvertently actuated.

2. The shifting mechanism of claim 1, wherein the first moving path and the second moving path are connected to form an L-shaped or an inverse L-shaped path.

3. The shifting mechanism of claim 1, wherein the first moving path and the second moving path are bridged by a connection path to form a U-shaped or an inverse U-shaped path.

4. The shifting mechanism of claim 1, wherein the first moving path and the second moving path are bridged by a connection path to form a Z-shaped or an inverse Z-shaped path.

5. The shifting mechanism of claim 1, wherein the first moving path and the second moving path are bridged by a connection path to form an N-shaped or an inverse N-shaped path.

6. The shifting mechanism of claim 1, wherein the first moving path and the second moving path are bridged by a connection path to form an H-shaped path.

7. The shifting mechanism of claim 1, wherein when the free end of the operation bar is moved from the first moving path to the second moving path, the first switch is automatically and always first switched to a forward rotation position.

8. The shifting mechanism of claim 1, wherein the guiding means is a plate having a continuous slot to restrict the operation bar to a moving path that includes at least the first moving path and the second moving path.

9. A shifting mechanism mounted on an electric vehicle to couple with a first switch to control the first switch to selectively effect a forward rotation, and a reverse rotation of a vehicle motor of the electric vehicle, and to couple with a second switch to switch the second switch between a high rotation speed position and a low rotation speed position, to respectively effect a high rotation speed and a low rotation speed of the vehicle motor, comprising:

an operation bar having a hand grip section on an upper end for users to move the operation bar, and a free lower end, wherein moving of the hand grip section causes one of the first and second switches to be actuated; and a guiding means fixedly mounted on the electric vehicle for restricting the free end of the operation bar to move reciprocally in a first moving path and a second moving path, the first moving path and the second moving path extending in different directions, the free end being allowed to move in the first moving path to actuate the first switch, and in the second moving path to actuate the second switch.

wherein when the free end of the operation bar is moved from the second moving path to the first moving path, the second switch is automatically and always first switched to the low rotation speed position; and wherein since the first moving path and the second moving path extends in different directions, a user is prevented from accidentally moving the operation bar from the first moving path to the second moving path, and from accidentally moving the operation bar from the second moving path to the first moving path, thereby ensuring the first and second switches are not inadvertently actuated.

10. The shifting mechanism of claim 9, wherein the operation bar has a boss.

11. The shifting mechanism of claim 9, wherein the guiding means has a housing trough having a cross section corresponding to a shape of the boss to allow the operation bar to be movably located in the housing trough such that the operation bar is movable on a straight line in parallel with a path of the housing trough to allow the free end of the operation bar to shift between the first switch and the second switch.

12. The shifting mechanism of claim 9, wherein the guiding means is a plate having a continuous slot to restrict the operation bar to a moving path that includes at least the first moving path and the second moving path.

13. The shifting mechanism of claim 12, wherein the first moving path and the second moving path are bridged by a connection path to form a U-shaped or an inverse U-shaped path.

14. The shifting mechanism of claim 12, wherein the first moving path and the second moving path are connected to form an L-shaped or an inverse L-shaped path.

15. The shifting mechanism of claim 12, wherein the first moving path and the second moving path are bridged by a connection path to form an N-shaped or an inverse N-shaped path.

16. The shifting mechanism of claim 12, wherein the first moving path and the second moving path are bridged by a connection path to form a Z-shaped or an inverse Z-shaped path.

17. The shifting mechanism of claim 12, wherein the first moving path and the second moving path are bridged by a connection path to form an H-shaped path.

18. The shifting mechanism of claim 9, wherein when the free end of the operation bar is moved from the first moving path to the second moving path, the first switch is automatically and always first switched to a forward rotation position.

19. A shifting mechanism mounted on an electric vehicle to couple with a first switch to control the first switch to selectively turn on or off a power supply transmission to a vehicle motor of the electric vehicle, and to couple with a second switch to switch the second switch between a forward rotation position and a reverse rotation position, to respectively effect a forward rotation and a reverse rotation of the vehicle motor, comprising:

an operation bar having a hand grip section on an upper end for users to move the operation bar, and a free lower end, wherein moving of the hand grip section causes one of the first and second switches to be actuated; and a guiding means fixedly mounted on the electric vehicle for guiding the free end of the operation bar to move reciprocally in a first moving path and a second moving path, the first moving path and the second moving path extending in different directions, the free end being allowed to move in the first moving path to actuate the first switch, and in the second moving path to actuate the second;

wherein when the free end of the operation bar is moved from the first moving path to the second moving path, the first switch is automatically and always first switched to turn on the power supply transmission; and wherein since the first moving path and the second moving path extends in different directions, a user is prevented from accidentally moving the operation bar from the first moving path to the second moving path, and from accidentally moving the operation bar from the second moving path to the first moving path, thereby ensuring the first and second switches are not inadvertently actuated.

20. The shifting mechanism of claim 19, wherein when the free end of the operation bar is moved from the second moving path to the first moving path, the second switch is automatically and always first switched to a forward rotation position.

* * * * *